United States Patent Office 3,140,161
Patented July 7, 1964

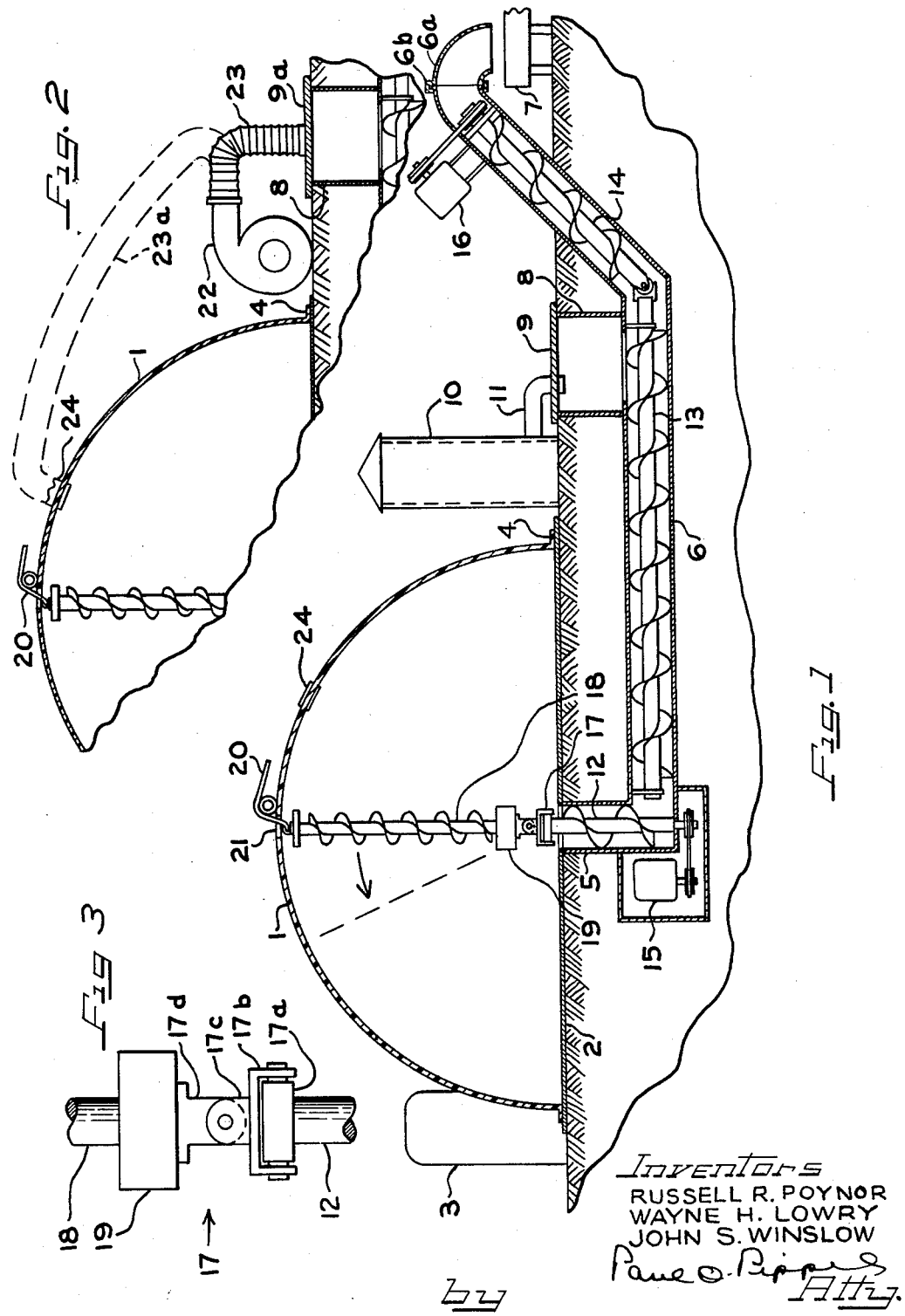

3,140,161
CROP STORAGE AND MECHANICAL REMOVAL
Russell R. Poynor, Geneva, Wayne H. Lowry, Riverdale, and John S. Winslow, Park Forest, Ill., assignors to International Harvester Company, Chicago, Ill., a corporation of New Jersey
Filed Oct. 25, 1961, Ser. No. 147,602
8 Claims. (Cl. 34—227)

This invention pertains to the storing and drying of crops. It deals with an air-tight storage structure which also may be used in conjunction with heating apparatus for effective crop drying.

Conventional structures used for the storage and drying of crops are limited in their effectiveness by non-uniform drying rates, usually resulting in the overdrying of the bottom layers of the crop. Accordingly, it is an object of this invention to provide a structure allowing uniform in-storage drying.

Another object of this invention is the provision of a structure through which a drying fluid is forced, said structure having a decreasing cross-sectional area in the direction of fluid flow.

Another object of this invention is the provision of an in-storage drying structure through which drying fluid may be forced in alternate directions.

Another object of this invention is the provision of a flexible dome-type storage structure which may be easily and simply erected.

Another object of this invention is the provision of a plastic dome-shaped storage structure which may be erected by means of pressure inflation and from which unloading may be simply and easily accomplished.

Still another object of this invention is the provision of a plastic dome-shaped storage structure easily inflated by gas pressure, loading and unloading of which is accomplished by means of an auger oscillating within the structure.

An additional object of this invention is the provision of a plastic dome-shaped storage structure of considerable cost savings over conventional storage structure, such as, for example, glass-lined silos.

The foregoing along with additional objects and advantages will be apparent from the following description of the specific embodiment of the invention as depicted in the accompanying drawings in which:

FIGURE 1 is a side elevational view partially in section showing the storage structure in its inflated condition along with the loading and unloading auger;

FIGURE 2 is a side elevational view partially in section showing the storage structure and its associated drying apparatus; and FIGURE 3 is a detail view of the mounting for the orbiting auger.

Generally speaking, the invention provides a gas-inflated dome-type structure for air-tight storage of crops in the wet state including corn silage, grass or hay silage, shelled corn and ground ear corn, for example. The structure may be erected on the ground in the field or may be used in conjunction with a moisture-proof bottom through which loading and unloading are accomplished by means of an orbiting auger. Additionally, in-storage drying may be accomplished by forcing heated air upwardly through the structure or by forcing air alternately upwardly and downwardly, these methods resulting in a more uniform drying rate compared with conventional methods.

Turning now more specifically to the drawings, the plastic or nylon dome 1 may be of hemispherical shape. In the embodiment shown it rests upon the moisture-proof floor 2 and is inflated by means of an inert gas supplied from the cylinder 3 through suitable conduit means, not shown. The circular bar 4 provides an airtight seal between the dome 1 and the floor 2.

Through floor 2 extends the downwardly directed passage 5 which in turn communicates with the subterranean passage 6. Passage 6 communicates through a spout 6a, which is swingable about a pivotal mounting 6b, with a mechanical bunk or loading platform 7 at a suitable external position, so that spout 6a may be inverted and grain dropped thereinto. Communicating with passage 6 is the hopper 8 having an air-tight cover 9. From the housing 10 a supplemental feed supply may be directed by means of chute 11 into hopper 8.

Within passages 5 and 6 are placed the augers 12, 13 and 14, which in turn are controlled by variable speed motors 15 and 16. To the top of auger 12 is fixed the mounting 17 for the orbiting auger 18. Mounting 17 comprises the horizontal bearing 17a fixed to auger 12. The pivotal element 17b is mounted on bearing 17a and includes the upstanding support 17c in an attitude normal to bearing 17a. This relationship provides a semi-universal mounting upon which is secured the variable speed motor 19 and auger 18.

The cable 20, which is controlled from a convenient external position, extends through a seal 21 into contact with oscillating auger 18 and is the means by which the angular position of oscillating auger 18 is determined and modified.

The burner and fan assembly 22 is connected through the duct 23 to the air-tight cover 9a of the hopper 8. An additional duct 23a may be connected to the air-tight access cover 24 of the dome 1 to provide controlled circulation.

Due to the light and flexible nature of the dome 1, it should be understood that a very low positive pressure from the cylinder 3 is sufficient to inflate dome 1 and maintain it in this condition. Although a completely airtight structure is desirable, slight leakage is not serious because of this pressure requirement.

The storage structure may be filled by means of the augers conveying material from loading station 7 through spout 6a and passage 6 into the interior of dome 1 or, alternatively, by means of an elevator (not shown) or other suitable conveying device oriented in proximity to the access opening closed by cover 24. Unloading may be easily accomplished by means of the augers. Cable 20 is adjusted to set the angular position of auger 18 and upon actuation of the motors auger 18 is rotated. In contact with stored material, it orbits in a conical defining movement, conveying material from dome 1 to augers 12, 13 and 14 and outwardly therefrom. The material may be mixed with supplemental feed if desired.

In-storage drying is accomplished by introducing heated air through hopper 8, passages 6 and 5 into the interior of dome 1. As the air flows upwardly through dome 1 it accumulates moisture and loses some of its drying capacity. However, the cross-sectional area of the dome-shaped structure decreases, resulting in a smaller amount of material to be dried as the air approaches the top of the dome and, accordingly, compensating for the decrease in the drying capacity of the air. The initial conditions of the air may be regulated by burner and fan 22 to provide a uniform drying rate throughout the dome-shaped structure. Because of the relatively air-tight construction, a controlled circulation may be maintained into, through, and out of dome 1.

Introduction of the drying fluid alternately through the access closed by cover 24 and the floor 2, where overdrying of the lower layers of material is found, provides an additional means by which uniform drying may be insured. This may be required due to size variations of the dome. For example, preliminary studies indicate that convenient sizes would be dome having a 10 ft.

radius as a minimum for the storage of shelled corn and a 30 ft. radius as a maximum for silage. However, domes of varying sizes often may be filled with material for which they are not designed.

Since various modifications can be made in the invention as hereinabove described and many apparently widely different embodiments of same made within the spirit and scope of the claims without departing from such spirit and scope, it is intended that all matter contained in the accompanying specification shall be interpreted as illustrative only and not in the limiting sense.

I claim:

1. In combination, crop storage means comprising a base, inflatable hemispheroidal housing means supported on said base, air-tight sealing means securing said housing means to said base, means for supplying fluid under pressure to inflate said housing means, conveyor means extending through said base for loading and unloading of said storage means, said conveyor means including rotatable auger means pivoted at one end adjacent said base, and flexible means supporting the other end of said auger means from said housing means, whereby rotation of said auger means results in its orbiting in a path of conical configuration.

2. The combination according to claim 1, further comprising a source of drying fluid, means for directing said drying fluid through said base into said housing means, and means for directing said drying fluid out of said housing means opposite said base.

3. The combination according to claim 1, further comprising a source of drying fluid, means for directing said drying fluid into said housing means opposite said base, and means for directing said drying fluid out of said housing means through said base.

4. The combination according to claim 1, further comprising a source of drying fluid and means for selectively directing said drying fluid into said housing means through said base, and out of said housing means opposite said base and into said housing means opposite said base and out of said housing means through said base.

5. In combination, crop storage means comprising a base, inflatable hemispheroidal housing means supported on said base, air-tight sealing means securing said housing means to said base, means for supplying fluid under pressure to inflate said housing means, and conveyor means extending through said base for loading and unloading of said storage means, said conveyor means including rotatable auger means pivoted at one end adjacent said base, and a cable connected to the other end of said auger means and extending through said housing means, whereby rotation of said auger means results in its orbiting in a path of conical configuration.

6. The combination according to claim 5, further comprising a source of drying fluid, means for directing said drying fluid through said base into said housing means, and means for directing said drying fluid out of said housing means opposite said base.

7. The combination according to claim 5, further comprising a source of drying fluid, means for directing said drying fluid into said housing means opposite said base, and means for directing said drying fluid out of said housing means through said base.

8. The combination according to claim 5, further comprising a source of drying fluid, and means for selectively directing said drying fluid into said housing means through said base and out of said housing means opposite said base and into said housing means opposite said base and out of said housing means through said base.

References Cited in the file of this patent

UNITED STATES PATENTS

| | | |
|---|---|---|
| 717,634 | Smead | Jan. 6, 1903 |
| 2,000,103 | Shodron | May 7, 1935 |
| 2,336,378 | Uhlig | Dec. 7, 1943 |
| 2,895,400 | Topf | July 21, 1959 |
| 2,925,666 | Gilmore et al. | Feb. 23, 1960 |